United States Patent [19]
Wetmore et al.

[11] Patent Number: 5,546,586
[45] Date of Patent: Aug. 13, 1996

[54] METHOD AND APPARATUS FOR VECTORIZING THE CONTENTS OF A READ ONLY MEMORY DEVICE WITHOUT MODIFYING UNDERLYING SOURCE CODE

[75] Inventors: Russ Wetmore, Santa Clara; Philip Nguyen, Santa Cruz, both of Calif.

[73] Assignee: Apple Computer, Inc., Cupertino, Calif.

[21] Appl. No.: 58,876

[22] Filed: May 6, 1993

[51] Int. Cl.⁶ ............................................. G06F 9/44
[52] U.S. Cl. ............... 395/700; 364/280; 364/280.4; 364/281.3; 364/DIG. 1
[58] Field of Search ............... 395/700, 650; 364/280, 280.1, 280.4, 280.5, 281.3

[56] References Cited

U.S. PATENT DOCUMENTS

| | | | |
|---|---|---|---|
| 4,542,453 | 9/1985 | Patrick et al. | 395/375 |
| 4,610,000 | 9/1986 | Lee | 365/189 |
| 4,688,173 | 8/1987 | Mitarai et al. | 364/405 |
| 4,751,703 | 6/1988 | Picon et al. | 371/10 |
| 4,802,119 | 1/1989 | Heene et al. | 364/900 |
| 4,831,517 | 5/1989 | Crouse et al. | 364/200 |
| 4,982,360 | 1/1991 | Johnson et al. | 364/900 |
| 5,193,180 | 3/1993 | Hastings | 395/575 |
| 5,297,291 | 3/1994 | Murphy | 395/700 |

FOREIGN PATENT DOCUMENTS

| | | | |
|---|---|---|---|
| 15940 | 9/1992 | WIPO | G06F 9/445 |
| 00633 | 1/1993 | WIPO | G06F 11/34 |

OTHER PUBLICATIONS

No Author, *IBM Technical Disclosure Bulletin*, vol. 31, No. 1, Jun. 1988, pp. 294–298, "Dual Indirect RAM/ROM Jumptables for Firmware Updates" see whole document.
No Author, *IBM Technical Disclosure Bulletin*, vol. 35, No. 7, Dec. 1992, pp. 8–13, "Method and Mechanism for Dynamic Loader" see p. 11 line 41, p. 13 line 32.

Bradley et al. *IBM Technical Disclosure Bulletin*, vol. 27, No. 4A, Sep. 1984, pp. 2187–2188, "Method of Customizing Patches for Each Hardware Configuration" see whole document.

IBM Technical Disclosure Bulletin, vol. 31, No. 1, "Dual Indirect RAM/ROM Jump Tables for Firmware Updates", Jun. 1988, pp. 294–298.

Jourdain, "Programmer's Problem Solver for the IBM PC, XT & AT", 1986, pp. 21–25.

*Primary Examiner*—Kevin A. Kriess
*Assistant Examiner*—Dennis M. Butler
*Attorney, Agent, or Firm*—Blakely, Sokoloff, Taylor & Zafman

[57] ABSTRACT

A method and apparatus for generating an object file that facilitates patching and the introduction of new function. The present invention accomplishes this without disturbing the original source file. The present invention is particularly useful in the generation of programs that will exist on a static device such as a Read Only Memory (ROM) device. The present invention requires that access to routines in the object file be referenced through a vector table located in Random Access Memory (RAM). If a routine in ROM must be patched (i.e. replaced) or if new function is added, the vector table is modified. Modification may be either changing the contents of an existing entry (replacement) or adding a new entry (new function). Generally, this modification involves the steps of: identifying the entry points in the object file to create a vector source table, generating a vector object table from the vector source table; generating a symbol table from the vector object table; comparing entry points in the object files to entries in the symbol table; when a match is found, modifying the entry point of the object file to reference a corresponding entry in the vector table. Since the only the object file is modified, the original source file is not disturbed.

4 Claims, 8 Drawing Sheets

METHOD AND APPARATUS FOR VECTORIZING THE CONTENTS OF A READ ONLY MEMORY DEVICE WITHOUT MODIFYING UNDERLYING SOURCE CODE

BACKGROUND OF THE INVENTION

1. Field of the Invention

The present invention relates to the field of computer operating systems and the underlying code structure thereof.

2. Description of the Related Art

It is well known that a computer system relies on operating software, i.e. an operating system, to enable basic computer functionality. For example, an operating system allows a user to store and relieve files on a storage medium. Various approaches are used to provide the operating system software as part of the computer system. One approach utilized in IBM compatible computer systems is to provide a Basic Input Output System (BIOS) on a Read Only Memory (ROM) device. The BIOS contains the instructions for interaction between the various components of the computer system. The remainder of the Operating system functionality is loaded in Random Access Memory (RAM). In such implementations, the vast majority of the operating system functionality is loaded into the RAM. Other aspects of the operating environment namely the user interface tools, also would exist on RAM. This approach has the drawback of utilizing RAM which could otherwise be used for application programs.

An alternative approach is to provide as much operating system functionality into ROM as possible. This has the desired effect of freeing up RAM for application programs. This approach is used for the operating system for the Apple® Macintosh® family of computers, available from Apple Computer, Inc. of Cupertino, Calif. The organization of the Macintosh operating software between ROM and RAM as well as the Macintosh environment in general, is discussed in the publication entitled "Inside Macintosh Volume I", available from Addison-Wesley Publishing company.

The portion of the Macintosh operating environment that resides in ROM is comprised of two parts; the operating system and the user interface toolboxes. The operating system portion provides traditional operating system functionality. The toolboxes provides a standardized set of tools for application development. Examples of toolboxes include the Quickdraw Manager (for drawing figures on a display) Sound Manager and Resource Manager. The use of such toolboxes would be well known to one having familiarity with developing applications for the Apple Macintosh family of computers.

In the Macintosh environment routines based in ROM are typically accessed using what is known as the A-Trap dispatching mechanism. The A-Trap dispatching mechanism is described in the publication "Programmer's Guide To MPW Volume 1", Mark Andrews, available from Addison-Wesley publications (MPW is an acronym for Macintosh Programmer's Workshop). The A-Trap dispatching mechanism allows for the calling of the ROM based routines symbolically through the trap dispatcher, rather than by absolute ROM address.

One problem with storing code in ROM is that it is static and cannot be fixed (absent physically replacing and re-writing the ROM). Accordingly, adding functionality or fixing "bugs" found in the operating system ROM code is very tricky. To fix a bug or add functionality, one must either patch the vectors maintained by the A-Trap dispatching mechanism, or patch the private vectors maintained by some of the tool box managers. "Patch" is a term of art which refers to new code introduced to fix prior code or to add functionality. A ROM vector causes a jump to a location in RAM where the patch code may reside. However, because there are a limited number of such vectors, most of the code is called directly and cannot be easily patched.

To patch non-vectorized code, one must be very creative. In some cases, all clients of the offending code can be patched. Clients in this context refers to code that calls or receives data from the offending code. In other cases a routine called by the offending routine may be patched to fix what the calling routine did wrong. This is called a "come from" patch and it usually identifies the caller by comparing the return address with a known absolute address. When small patches are made to large routines, it is common practice to call the existing code in ROM to save memory. Usually this is done by jumping to the absolute address in the ROM. In doing so, the absolute address in ROM becomes hard coded into the patch.

Because of these absolute addresses hard-coded into the patches, the ROM is very difficult to maintain. Much care must be taken to assure any changes or additions to the ROM will not change the addresses of the existing code. This has the undesirable effect of making the ROM based code non-relocatable (because of code reliance on absolute addresses). This becomes even more difficult as more operating system code is written in high level languages.

Despite such obstacles, it is desirable to place operating system functionality in ROM because it reduces the amount needed for RAM. Consequently, this flees RAM resources to be used for application software programs. Another advantage is that it is easier to protect ROM based code from unauthorized copying.

Moreover, as application software becomes integrated into base functionality of computer system, it is likely the application software itself will become ROM based. As more functionality is placed in ROM, the foregoing maintenance difficulties are compounded.

Thus, it is an object of the present invention to provide a mechanism for generating code that will in reside in ROM so that patches or additional function may be added with greater ease. It is a further object of the present invention to simplify the patch installation process.

SUMMARY

The present invention is directed towards a method for generating an object file so that patches or additional functionality may be added without disturbing the original object file. The present invention is particularly useful in the generation of programs that will exist on a static storage device such as a Read Only Memory (ROM) device. Since the code on ROM cannot be fixed without removing the ROM from the computer system patches must be implemented by code that resides on system Random Access Memory (RAM). The present invention facilitates this by modifying object files so that access to routines in the object file are referenced through a table located in RAM. In this manner, if a routine in ROM causes erroneous results, the routine in ROM may be bypassed, by modifying the table to reflect the address of a replacement routine (typically somewhere in RAM).

The present invention modifies the object file by a process termed vectorization. Because vectorization is performed on the object files, the source files are not affected. Generally what occurs is that object file entry points are identified and references to the entry points are modified so that access to the code corresponding to the entry point is made through a table. Entry points in the object file include subroutines or functions or identified labels for a particular line of code. The present invention involves the steps of: generating object files from the source code (via compilation or assembly); identifying the entry points in the object file to create a vector source table; generating a vector object table from the vector source table; generating a symbol table from the vector object table; comparing entry points in the object files to entries in the symbol tables; when a match is found, modifying the entry point of the object file to reference a corresponding entry in the vector table.

DETAILED DESCRIPTION OF THE PREFERRED EMBODIMENT

Figure 1:
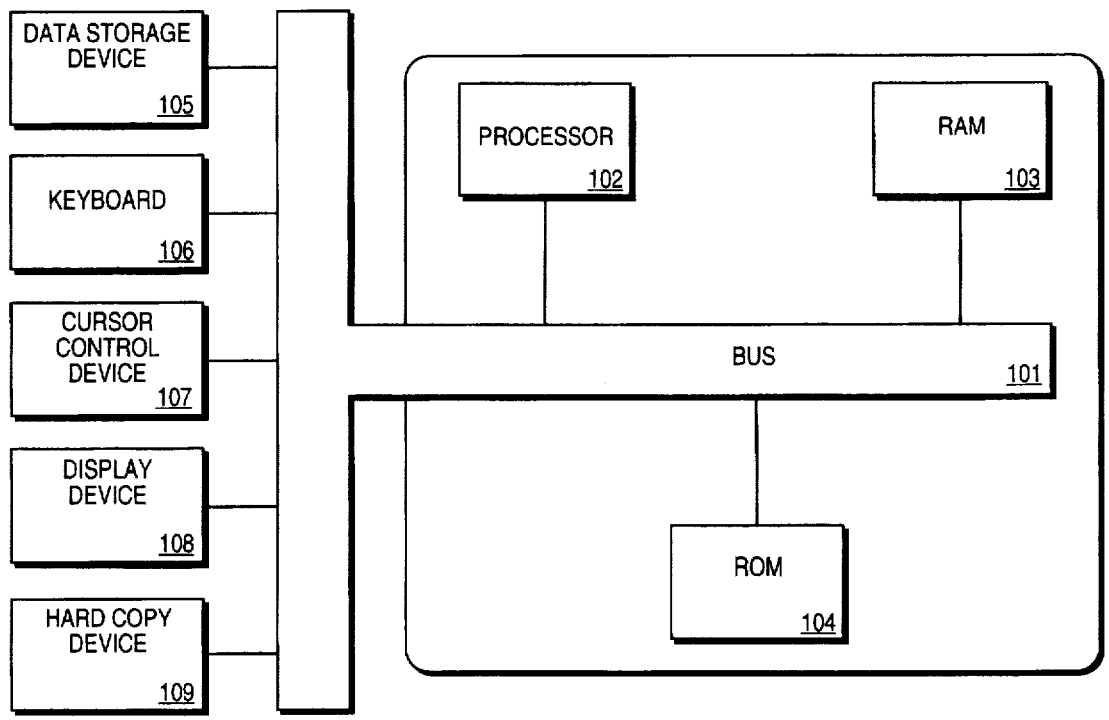
FIG. 1 is a block diagram illustrating the basic components of a computer system as may be utilized by the currently preferred embodiment of the present invention.

This specification is related to, and hereby fully incorporates by reference, Ser. No. 08/058,877, entitled "Method and Apparatus For Patching Code Residing on a Read Only Memory Device", filed on May 06, 1993, and assigned to the same assignee, Apple Computer, Inc.

A method and apparatus for vectorizing coded instructions, such as instructions stored in a Read Only Memory (ROM) device, in a computer system is described. In the following description, numerous specific details are set forth such as coding examples, in order to provide a thorough understanding of the present invention. It will be apparent, however, to one skilled in the art that the present invention may be practiced without these specific details. In other instances, well-known circuits, control logic and coding techniques have not been shown in detail in order not to unnecessarily obscure the present invention.

The following description will include various code examples of assembly language instructions of the Motorola 680X0 family of microprocessors. Further, various references are made to the structure of the operating environment of the Apple Macintosh. In both instances, one familiar with programming in the Macintosh environment would be familiar with such references and related concepts.

Overview of the Computer System of the Preferred Embodiment

The computer system of the preferred embodiment is described with reference to FIG. 1. The present invention is preferably implemented on a general purpose microcomputer in which a significant amount of operating or application software resides on a static memory device, such as one of the members of the Apple® Macintosh® family of computers. In any event, a computer system as may be utilized by the preferred embodiment generally comprises a bus or other communication means 101 for communicating information, a processing means 102 coupled with said bus 101 for processing information, a random access memory (RAM) or other storage device 103 (commonly referred to as a main memory) coupled with said bus 101 for storing information and instructions for said processor 102, a read only memory (ROM) or other static storage device 104 coupled with said bus 101 for storing static information and instructions for said processor 102, a data storage device 105, such as a magnetic disk and disk drive, coupled with said bus 101 for storing information and instructions, an alphanumeric input device 106 including alphanumeric and other keys coupled to said bus 101 for communicating information and command selections to said processor 102, a cursor control device 107, such as a mouse, track-ball, cursor control keys, etc., coupled to said bus 101 for communicating information and command selections to said processor 102 and for controlling cursor movement, and a display device 108 coupled to bus 101 for displaying textual, graphical or video output. Additionally, it is useful if the system includes a hardcopy device 109, such as a printer, for providing permanent copies of information. The hardcopy device 109 is coupled with the processor 102 through bus 101.

The computer system of FIG. 1 may be both a system which generates the vectorized ROM code or a system which utilizes the vectorized ROM code, or both. In a computer system having the vectorized code of the present invention, it is the ROM 104 that will contain the static code. Non-static code and vector tables will reside in the RAM 103. Further, during the generation of such vectorized code, a processor on a computer system, such as the processor 102 of FIG. 1, will perform processing function means. For example, the vectorizing and linking of object files would be performed by the processor 102.

Figure 2:
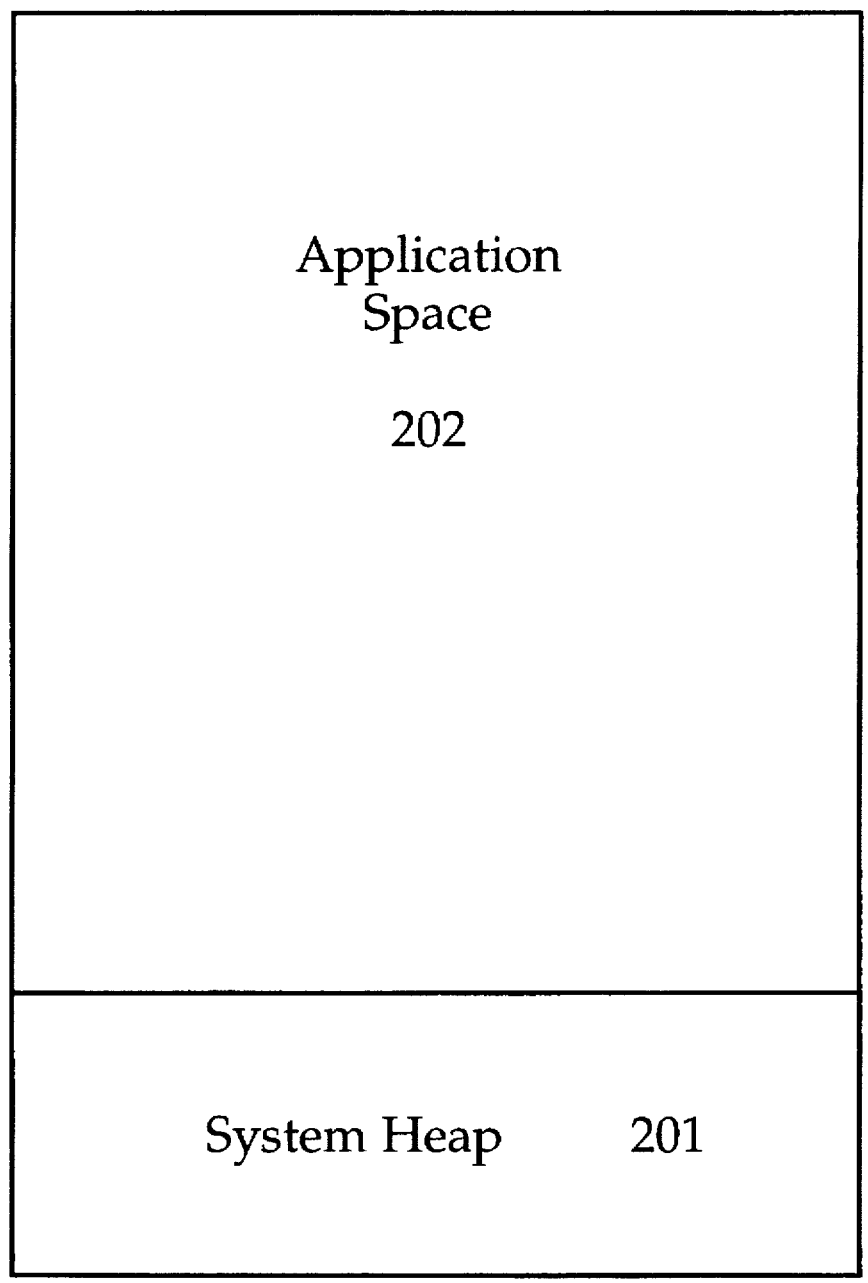
FIG. 2 illustrates the general organization of Random Access Memory (RAM) of the currently preferred embodiment of the present invention.

The organization of RAM 103 as found on the preferred Apple Macintosh System is illustrated in FIG. 2. For the purposes of this description, consider the RAM as organized into two areas: system heap 201 and application space 202. The system heap area 201 contains all the operating system code and utilities. As will be described in more detail below, it is in this system heap area 201 that the vector tables are loaded and stored. The application space 202 is the available memory for applications programs.

OVERVIEW OF ROM VECTORIZATION

As noted above with respect to the prior art, there are numerous benefits of having ROM based code. However, as code in ROM is static, patching to apply fixes or add functionality is tricky and requires patching to an existing vector. Although vectors are used on the A-Trap mechanism and locally by some toolbox managers, the number of vectors is far too few for maintaining a dynamic and robust operating environment. Consequently the present invention provides a means for generalizing the introduction of vectors into ROM based code. It should be noted that the fact that this code is to reside on ROM is not meant to limit the scope of the present invention. Any system could use "static" code in, for example "FLASH" memory magnetic or optical disk media or other storage devices, without causing departure from the spirit and scope of the present invention.

Another benefit of this technique is that the programmer need not be constrained or concerned about the absolute physical addresses in the ROM. All the programmer has to be concerned about is generating the source code. Moreover as there is no change to the source code, the use of vectors is transparent to the programmer. This will greatly simplify ROM maintenance and allow products to be developed and introduced into the marketplace at a much quicker pace.

ROM vectorization is the process by which static program code that is to be installed in ROM is modified to create external references to a vector table in RAM. The entries in the vector table contain pointers to the location of the various code that will be executed. Generally, when the ROM code is vectorized, entry points for external routines are replaced by a reference to a table and an offset into the table. The corresponding table entry will then point to the location of the routine. As the ROM code is executing, upon encountering a reference to an external routine, e.g. a subroutine or function call, the actual entry point will reference the vector table and the corresponding entry in the vector table will point to (e.g. have the address of, or be a JMP instruction to) the actual code to be executed.

Figure 3:
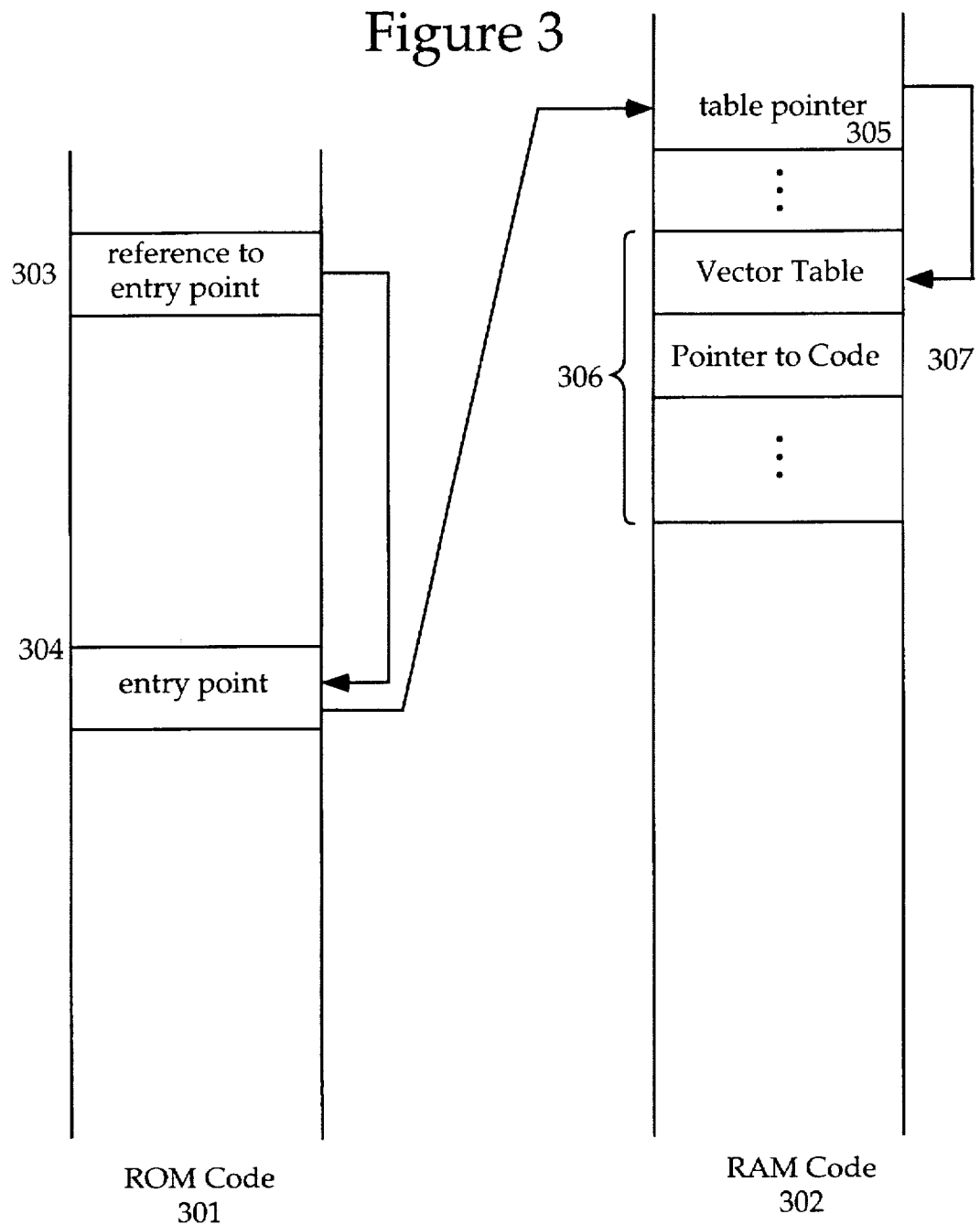
FIG. 3 illustrates the implementation of an indirect vector as may be utilized in the currently preferred embodiment of the present invention.

The effect of vectorization is described with reference to FIG. 3. Referring to FIG. 3, illustrated is ROM based code 301 and RAM code 302. The only thing illustrated here in the RAM code 302 is the vector table 306. In any event, ROM code 301 will contain a reference to an entry point 303. The entry point may be a sub-routine, function, macro or a jump to a label somewhere else in the ROM code 301. Note that various other linkage code to allow return after the sub-routine or function is not illustrated but is assumed to exist. The reference to entry point 303 will effectively point to entry point 304. Without vectorization, the executable code would be immediately following the entry point 304. With vectorization, the location of entry point 304 has been modified to be a reference to a table pointer 305 that resides in RAM. The table pointer 305 is the vector in this example. The table pointer 305 will point to vector table 306 which resides in RAM code 302 (specifically the system heap area).

As noted above, the reference to the table would in most cases include an offset into the vector table 306. Assuming the offset, the entry 307 will contain a pointer to the location where the code to be executed would reside. While the entry 307 may simply point back into the ROM, in the instance of a patch, the entry 307 may contain a pointer to an updated routine located somewhere in the RAM 302.

In the currently preferred embodiment, the foregoing example describes an "Indirect Vector" type (i.e. the table pointer 305). The currently preferred embodiment includes two other vector types; a Direct Vector and an Indirect Jump Vector. A Direct Vector is longword in low memory that contains the address of the routine. A Direct Vector is used when execution speed is the paramount concern. The Indirect Vector Jump is similar to the Indirect Vector but differs by using a Jump table in place of a vector table. The Indirect Vector Jump is used in situations when a scratch register isn't available and the code is in cache.

Vectorization facilitates maintenance of ROM based code by removing the need to rely on actual physical addresses in ROM when fixing "bugs". The term "bug" is a term well known to those skilled in the art and in the context of software design, refers to the existence of logic or other errors which cause a software program to malfunction. Basically, through the vectorization of the present invention, more entry points into the ROM are created, thus providing more locations at which the ROM may be accessed and code fixed. Further, it eliminates the need to hard code absolute addresses into the patched code. In other words, the ROM code is modularized to a greater extent so that respective modules may be more easily replaced.

Organization of Vector Tables

In the Macintosh environment, the various application development tools are organized into toolboxes. Control of a toolbox is performed by its "toolbox manager". In the currently preferred embodiment each "toolbox manager" will have its own vector table. For example, in the Apple Macintosh environment, the Window manager, Dialog manager and QuickDraw manager all have their own vector tables. By arranging the vector routines in groups the tables in system software may be easily expanded. Also, complete tables can be replaced with new ones when a tool box manager is rewritten. Each vector table is accessed through a pointer stored in low memory.

Another advantage of organization into vector groups, is that internal ROM code can make use of the vector tables directly. New ROM source code could be developed taking advantage of the vector groups assigned so far. Using this technique a vector table does not need to have a predefined size.

By keeping the vectors in their own respective groups, vector table initialization may occur independently (as will be described in greater detail below, vector tables must be initialized before use). Vectorized routines must have their vector table entry initialized. This is accomplished by creating a small routine for each vector group which takes care of the vector table initialization. As will be described below, the initialization routine is created during the vectorization process.

ROM Vectorization

Figure 4:
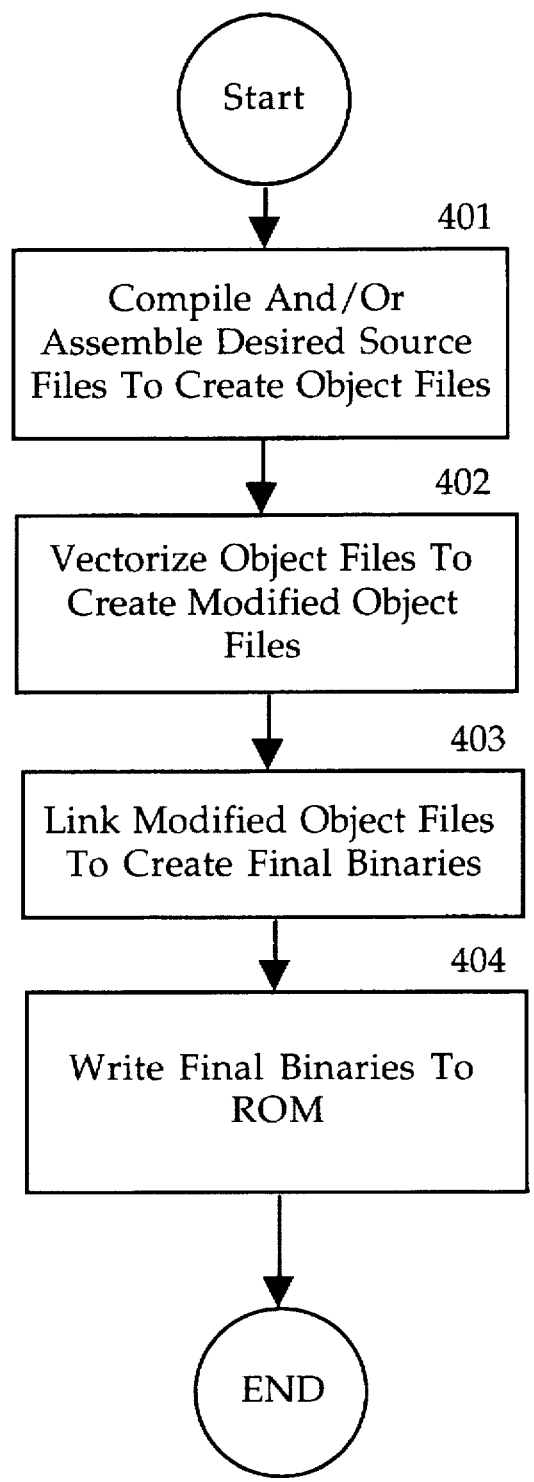
FIG. 4 is a flowchart which describes the steps of creating a vectorized ROM as may be performed in the currently preferred embodiment of the present invention.

The manner in which the code in a ROM is vectorized is illustrated by the steps in the flowchart of FIG. 4. First, the source files are compiled (in the case of a high level language) or assembled (in the case of assembler language source) to create object files, step 401. The object files are then vectorized to create vectorized object files, step 402. It is significant that only the object files are modified. The source files are not touched. Object files contain a series of defined records, each one containing specific items such as the object code for a routine, the name of a routine, external reference from one routine to another, or comments. In object files the references to other routines have not been resolved. Therefore object files are an ideal place to alter the code without modifying the source code files. The steps for vectorization are described in more detail below with respect to FIG. 5.

The object files are then linked together to create the final binary values which will be written to ROM, step 403. This is performed through a traditional linkage editing step. Finally, after the object files have been "linked" together to create the final binaries, the ROM image is created, step 404.

Figure 5:
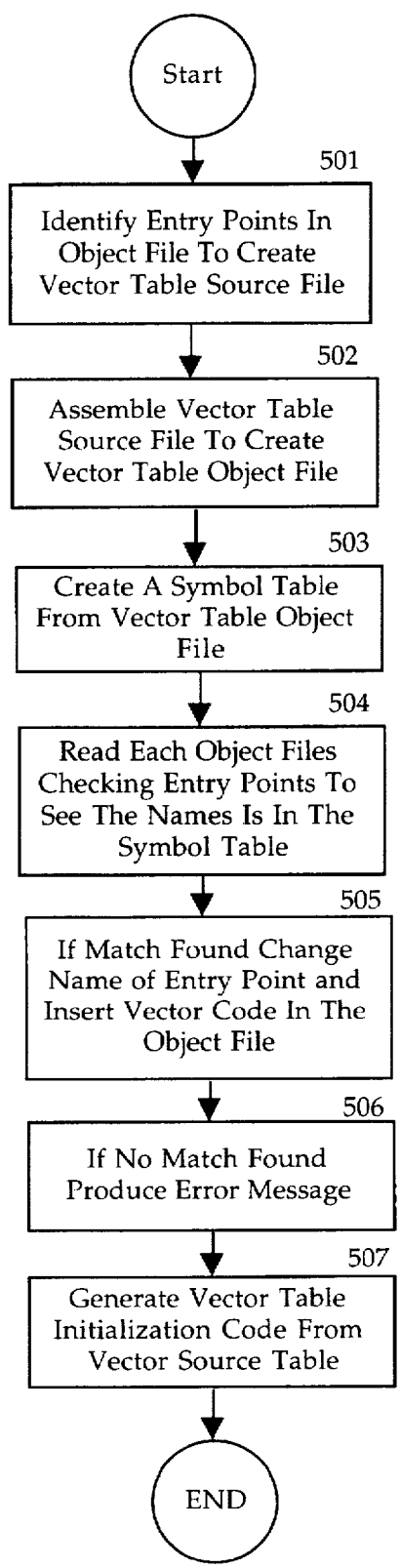
FIG. 5 is a flowchart which describes the specific steps for vectorizing an object file as may be performed in the currently preferred embodiment of the present invention.

FIG. 5 is a flowchart illustrating the steps for vectorizing an object file. Referring to FIG. 5, the entry points of the object file are first identified to create a vector table source file, step 501. An entry point may be the name of a routine or a label in the file. Generally, an entry point is merely a location in the code which may be entered via a symbolic reference. It is these entry points which become the code access points which are vectorized. The vector table source file is a set of assembly language instructions The vector table source file is described in greater detail below. Next, the vector table is assembled in order to create a vector table object file, step 502. For each entry in the vector table source file there is a corresponding module in a vector object file. Each of these modules has one entry point with the vector's name and one content record containing the glue code used to patch the original routine. An example of modules in the vector table object file are illustrated in Table 1.

TABLE 1

| Vector Table Object File | | |
|---|---|---|
| MaxBlock | Proc | Export |
| | jmp | ([$0584]) |
| | EndProc | |
| SwapZone | Proc | Export |
| | move.1 | $2050,a0 |
| | move.1 | $08(a0),a0 |
| | jmp | (a0) |
| | EndProc | |
| SendBit | Proc | Export |
| | move.1 | $2060,a0 |
| | jmp | $06(a0) |
| | EndProc | |

Referring to Table 1, three (3) entry points, MaxBlock, SwapZone and SendBit are illustrated. Each of the three entry points includes the "vector code" for accessing the routine. The vector code presented, which is written in the Motorola 680X0 Assembler language, is exemplary. It would be apparent to one skilled in the art that the functionality performed by this code can be implemented using different instruction formats or a different Assembler Language (one supported by the processor of the underlying computer system).

The entry MaxBlock is an example of a Direct Vector. The instruction jmp ([$0584]) will cause a direct jump to the location of the routine. Here the address of the desired routine is contained in the memory location address $0584. Note that the term jump as used here refers to program execution to continue at the address jumped to.

The entry SwapZone is an example of an Indirect Vector. Here the instruction move.1 $2050,a0 moves the contents of the location $2050 (the address for the vector table) into register a0. The instruction move.1 $08(a0),a0 causes the offset $08 to be added to the contents of the register a0. At this point the register a0 contains the address for the vector table entry of the desired routine. The jmp(a0) instruction causes a jump to the contents of the vector table entry, which is the entry address of the desired routine.

The entry SendBit is an example of an Indirect Jump Vector. The instruction move.1 $2060,a0 causes the contents of address $2060 to be moved into the register a0. The instruction jmp $06(a0) causes a jump to the address that is offset by $06 from the contents of the register a0. The address jumped to will contain another jump instruction to the entry address of the desired routine.

Once the vector table object file is created, the vectorized object file is created by replacing the entry point references with the appropriate vector code. Referring back to FIG. 5, a symbol table containing the vector names and the vector code is created, step 503. Each of the object files are then processed by comparing entry point names to the names in the symbol table, step 504. If a match is found, the entry point name in the object file is changed and the vector code is inserted in the object file, step 505. This will effectively cause the linkage editor to reference the vector code for all calls made to the original entry point. If no match is found an error/warning message is issued, step 506. After all the object files are vectorized, the vector table initialization code is generated from the vector source table (using a different set of macros than that used to create the vector table object file), step 507.

For maintenance purposes, each vectorized routine can be a version number so that updates and additions to the routine can be made. Updates and additions to routines is described in greater detail below.

Table 2 is an example of a routine which has been vectorized.

TABLE 2

| Vectorization Example | | |
|---|---|---|
| BEFORE VECTORIZATION | | |
| MaxBlock | Proc | Export |
| | link | a6,#04 |
| | unlk | a6 |
| | rts | |
| | EndProc | |
| AFTER VECTORIZATION | | |
| _v_MaxBlock | Proc | Export |
| | link | a6,#04 |
| | unlk | a6 |
| | rts | |
| MaxBlock | jmp | ([$0584]) |
| | EndProc | |

Referring to Table 2, before vectorization a routine MaxBlock performs the instructions between the code PROC Export and ENDPROC. In this example, MaxBlock is vectorized to contain a direct vector. After vectorization, the entry name label has been changed to _v_MaxBlock. The vector code with the original label MaxBlock is then appended to the original code sequence _v_MaxBlock. Here the label MaxBlock has the jmp ([$0584]) instruction. Absent any patches, the location $0584 will contain the address to the label _v_MaxBlock.

Starting a System with a Vectorized ROM

As noted above, a vectorized ROM does require that vector initialization code be called before a vector is used. ROM source code does not need to be modified except for the calling of the corresponding initialization routine. The initialization routine must be called from within the ROM before any vectorized routine can be used. This is done automatically at boot (system start-up) time.

Each toolbox manager in ROM has its own vector table pointer in low memory. In the currently preferred embodiment these memory locations have been pre-assigned and are stored in a text file where all of the vector information is kept. When a vector initialization routine is called, it initializes the vector table pointers so that they point to the right location in ROM. Generally, the vector initialize routine will allocate memory in the system heap for the vector table, put the vector table address in the given low memory location, and set-up the vector table with the routine's addresses.

In the currently preferred embodiment, the initialization routine is called three (3) times during the boot process. It is called first when it is determined that there is memory available, then again after the Memory Management Unit for the computer system has been setup and finally after the system heap has been created and the system memory is initialized to FF. After this third call, the vector pointers are stable and patching can take place. Patching is described in more detail below. However, it would be apparent to one skilled in the art that initialization could be implemented so that it occurs at other times during the system start-up process. Such implementations would not depart from the spirit and scope of the present invention.

Vector Directory

In the currently preferred embodiment the ROM will also contain a directory that describes all the various vectors. This is provided to facilitate the use of program debuggers. Generally, the address of the vector directory will be maintained at a predetermined location in ROM. The information concerning vectors is organized by vector type. Consequently, the vector directory contains pointers to various vector information tables. The vector information tables will contain a count of the vectors in the table, as well as pointers to the name of the corresponding entry point and the original code in ROM.

Vector Table Source File

Figure 6:
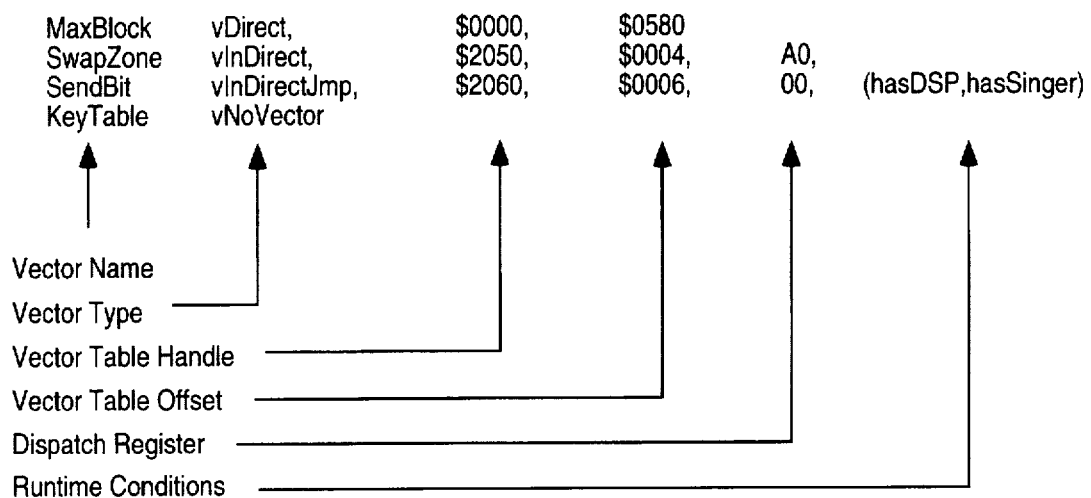
FIG. 6 is a chart illustrating a Vector Table Source File as may be utilized by the currently preferred embodiment of the present invention.

As is apparent from the foregoing description, in the currently preferred embodiment vectors are implemented using assembly language source files. This provides flexibility at little cost and allows the performance of conditional compilation. Each entry in the vector table source file will have a format depending upon the vector type. An example of the Vector Table Source file is provided in FIG. 6. The following is a description of the various fields in the vector source file.

Vector Name is the case sensitive name of the routine to be vectorized.

Vector Type is a macro that specifies which type of vector to apply to the particular routine.

Vector Table Handle is the address where the pointer to the particular vector table can be found at runtime. For direct vectors, the field makes little sense and should be zero. It would be possible to allocate a vector table pointer for direct vectors that could point to address zero or to the base of the appropriate trap dispatch table. This would allow all vector utility code to work the same regardless of the vector type.

Vector Table Offset is the offset into the vector table. For direct vectors, this is the absolute address of the vector itself.

Dispatch Register identifies a register that can be used to optimize the routine dispatch. If this field is zero or omitted, no optimization will take place.

Runtime Conditions This field can be used to select which code to install at runtime. The constants given must be compatible with the test for macro.

As described above, during the vectorization process, the vector table source file is compiled to produce an object file used by the vectorization tool. It is then recompiled using an alternate set of macros to produce the code that initializes the vector table.

Patching A Vectorized ROM

As the purpose of vectorizing the code is to facilitate fixing bugs or adding functionality, it is now useful to describe how it is done. The term patching is used to describe the process for creating and installing patches to the ROM that add functionality or fix bugs. In this particular instance, we are talking about patches applied to ROM vectors.

One difficulty in making patches results from the need to support prior versions of the ROM and the ROM code. With each released ROM the vectorized routine will have a version number. If a bug is discovered or a new function is added to the routine, then the new routine will have a higher version number when distributed with the new system disk. A ROM maintenance data base will keep track of all different versions of all the vectorized routines as well as which version belongs to what ROM and is smart enough to include the right version for each system release.

The patch mechanism of the currently preferred embodiment creates a vector patch resource to contain the new vectorized routines. A resource in the Macintosh environment refers to a static block of data that may be created, stored and manipulated independently from the program code. The vector patch resource is distributed on the system disk.

The system disk contains the portion of the operating system environment that does not reside on ROM. In the currently preferred embodiment. The system disk is used to create the operating environment for a computer.

In the currently preferred embodiment, an entry in the vector patch resource has the format illustrated in Table 3.

TABLE 3

| Vector Patch Resource Entry Format | |
|---|---|
| FIELD | USE |
| VectorTable Pointer | Pointer to Vector Table in Low Memory |
| VectorTable Entry | Offset into Vector Table For Entry For The Routine |
| Size of vectorized Routine | Specific Size of Routine in Bytes |
| Vectorized Routine | The New Code to Be Inserted |

Referring to Table 3, the VectorTable Pointer and VectorTable Entry are used to identify the Vector Table and the entry for the routine in the vector table, respectively, corresponding to the code that is to be inserted. The size of the Vectorized Routine precedes the actual Vectorized code.

The vector patch resource will typically contain numerous entries corresponding to the number of patches or the added functionality being provided. Note that there will be a vector patch resource for each version of the ROM that supports vectorized routines. Each vector patch resource will have an identifier corresponding to the ROM versions on which it should be loaded. So during the installation process the proper vector patch resource must be identified.

Vector patch resources are created when the operating system is updated and installed when the operating system is "built". The operating system is "built" whenever a user wishes to update the computer operating system software to a later release or version level. In the currently preferred embodiment of the present invention, a tool termed ROMPatch, is provided which automatically creates the vector patch resources. ROMPatch compares the object files of two versions of the vectorized ROM code to identify routines which are different or new. In the currently preferred embodiment, routines which are different are checked via a Cyclical Redundancy Check (CRC) operation. However, other techniques, e.g. assigning each routine a version number and simply comparing these version numbers, may be utilized without departure from the spirit and scope of the present invention. In any event, when all the patched routines are found, the vector patch resource is generated.

Figure 7A:
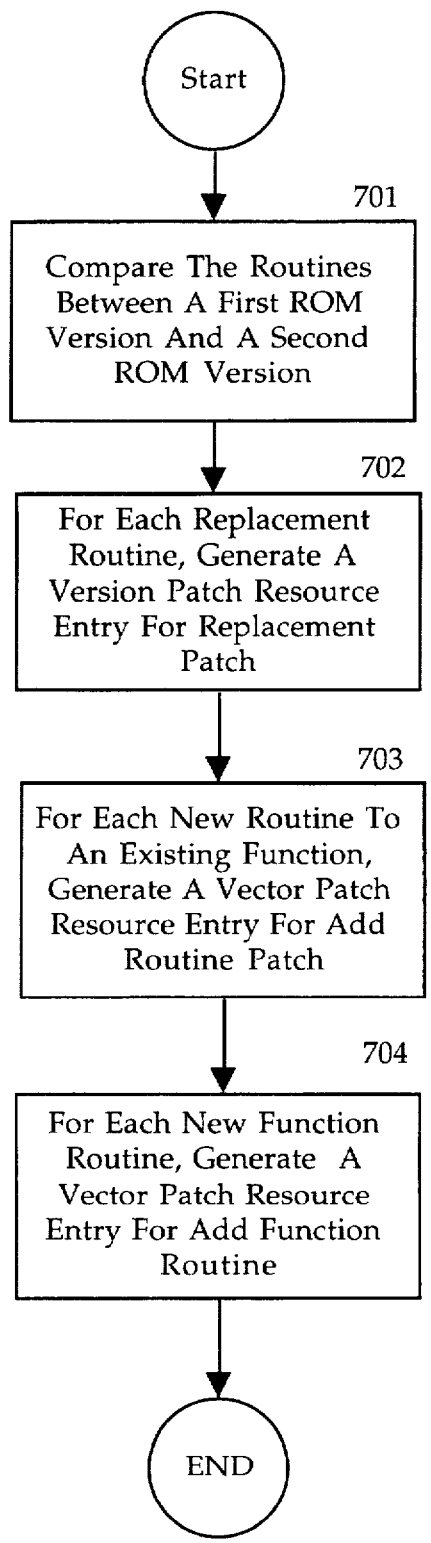
FIG. 7a is a flowchart describing the steps for generating vector patch resources, as may be performed by the currently preferred embodiment of the present invention.

The operation of the ROMPatch tool is further described with reference to FIG. 7a. Referring to FIG. 7a, the version information of routines of a first (previous) ROM version to a second (new) ROM version, step 701. As described above, a CRC operation may be performed between corresponding routines to determine if it has been changed. For each routine that is identified as a replacement routine, i.e. a new routine that will replace an existing routine, a vector patch resource entry for a replacement patch is created, step 702. A routine may be identified as a replacement routine by determining that the routine exists in both versions. For each routine that is identified as a new routine for an existing function, a vector resource patch entry for adding a routine to an existing function is generated, step 703. Here, a function will have its own vector table. So this will involve adding an entry to an existing vector table. Finally, for each new function routine, a vector patch resource entry for adding new function is generated, step 704. This will involve causing a new vector table to be created as well as the offset for the entries to be loaded into the vector table. The information for creation of new tables would come from the new ROM version object file.

Figure 7B:
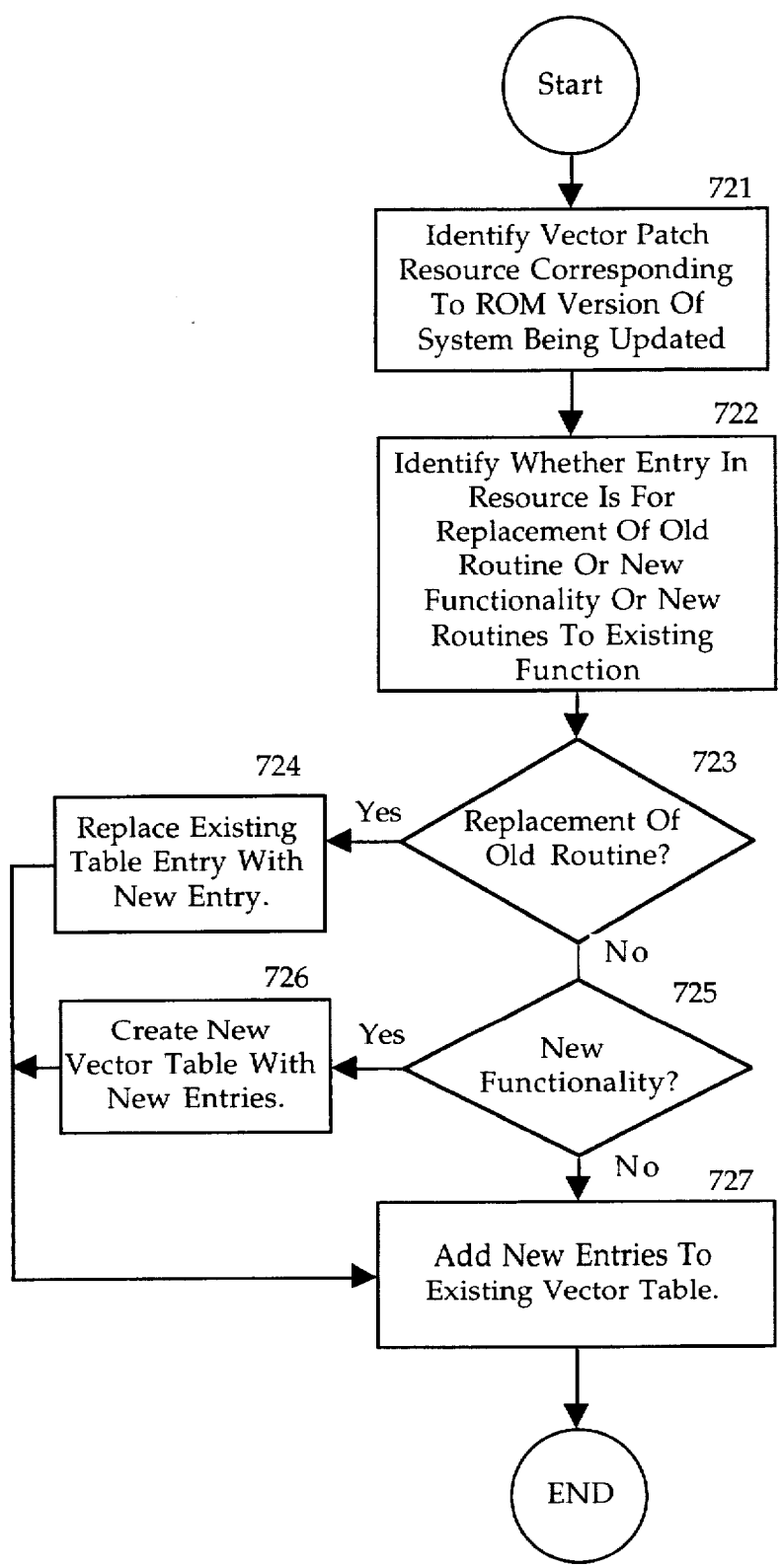
FIG. 7b is a flowchart describing the steps for vector table updating that is performed during patching, as may be performed by the currently preferred embodiment of the present invention.

To perform the patching a NewVector loader is included with the system disk and its sole purpose is to update and add vectorized routines. At boot time, the vector patch resource from the system files are loaded and only the vector patch resources with ID equal to or greater than the version of the ROM will be loaded. The operation of the NewVector loader is described with respect to the flowchart in FIG. 7b. First, the vector patch resource corresponding to the ROM version of the system being updated is identified, step 721. The remaining steps are performed for each entry in the vector patch resource that has been identified. When the vector patch resource is received, the entry must be identified as a replacement of an old routine, new functionality or a new routine, step 722. A determination is made if it is the replacement of an old routine, step 723, and if it is the existing table entry is replaced with a new entry, step 724. If it is not a replacement of an old routine, a determination is then made if it is a new routine, step 725, and if it is, a new vector table is created with new entries, step 726. If it is not a replacement of an old routine or new functionality, then it must be a new routine for an existing function. In this case, the new entries are simply added to the existing vector table, step 727.

Adding new entries to an existing vector table is accomplished by re-sizing the pointer to the vector table to make room for the new entries. In the currently preferred embodiment, in situations where the pointer cannot be re-sized, a new pointer is allocated and the old vector table is copied to the new location and then the new entries are added to the table and finally the low memory vector table pointer is updated with the new location. Other implementations may use other techniques, but would not depart from the spirit and scope of the present invention.

The patching technique described is used for each of the vector types. Use of other tables or additional indirection, e.g. a pointer to another table, would not depart from the spirit and scope of the present invention.

While the present invention has been described with reference to a computer operating system and FIGS. 1–7, it will be appreciated that the figures are for illustration only, and do not limit the spirit and scope of the present invention. In addition, it will be noted that the present invention may be realized using a variety of computer programming languages and hardware, and is not limited to any particular hardware and software configuration. The present invention may be utilized in any embodiment which has code stored in a read only storage device such as a ROM. For example, a microprocessor controller for controlling various operations of an automobile may embody the present invention. Similar types of embodiments would be within the scope of the present invention.

Thus, a method for vectorizing object files for storage in a static storage device is disclosed.

We claim:

1. A method for generating a vectorized object file comprising the computer-implemented steps of:
    a) compiling one or more source files to create one or more object files;
    b) identifying entry points in said one or more object files, wherein each entry point is a location in said one or more object files which may be entered via a symbolic reference;
    c) creating a vector table source file from said identified entry points, wherein said vector table source file is a file that contains entries that correspond to routines in said one or more object files, wherein each entry contains information about a corresponding routine;
    d) generating a vector table object file from said vector table source file, wherein said vector table object file is an object file that contains modules that correspond to routines in the one or more object files;
    e) generating a vectorized object file from said one or more object files based on said vector table object file, wherein said vectorized object file is an object file in which entry points have been replaced by pointers into the vector table object file;
    f) generating a vector table initialization file from said vector table source file, wherein said vector table initialization file is a file that contains routines that, when executed, initialize the vector table pointers; and
    g) appending said vector table initialization file to said vectorized object file.

2. The method as recited in claim 1 wherein said vector table object file is comprised of a plurality of modules, each of said plurality of modules containing an entry point identifier and vectorization code, said step of generating a vector table object file from said vector table source file is further comprised of the step of generating a vector table object file module for each entry point in said vector table source file.

3. The method as recited in claim 2 wherein said step of generating a vectorized object file from said vector table object file is further comprised of the steps of:
    a) generating a symbol table from said vector table object file;
    b) for each entry point in said one or more object files, checking for a corresponding symbol in said symbol table;
    c) if a corresponding symbol exists, changing the name of the entry point and inserting corresponding code from said vector table object file; and
    d) if a corresponding symbol does not exist, generating a warning message.

4. The method as recited in claim 3 wherein said step of generating a vector table initialization file from said vector table source file is further comprised of the step of generating a file that contains instructions which, when executed by a processor, cause said processor to:
    allocate memory for said vector table;
    place the vector table address in a predetermined low memory location; and
    load the vector table with the addresses of the actual location of the routines.

\* \* \* \* \*